(12) United States Patent
Carson (10) Patent No.: US 8,909,190 B2
(45) Date of Patent: Dec. 9, 2014

(54) PORTABLE WIRELESS COMPATIBILITY DETECTION, LOCATION AND COMMUNICATION DEVICE

(76) Inventor: Dale Carson, Jacksonville, FL (US)

( * ) Notice: Subject to any disclaimer, the term of this patent is extended or adjusted under 35 U.S.C. 154(b) by 841 days.

(21) Appl. No.: 12/119,620

(22) Filed: May 13, 2008

(65) Prior Publication Data

US 2009/0287853 A1 Nov. 19, 2009

(51) Int. Cl.
 *H04W 4/22* (2009.01)
 *H04W 40/20* (2009.01)
 *H04W 4/02* (2009.01)
 *H04L 29/08* (2006.01)
 *H04W 40/14* (2009.01)
 *H04W 40/24* (2009.01)

(52) U.S. Cl.
 CPC ............... *H04W 40/20* (2013.01); *H04W 4/02* (2013.01); *H04L 67/16* (2013.01); *H04L 67/306* (2013.01); *H04L 67/04* (2013.01); *H04L 67/18* (2013.01); *H04W 40/14* (2013.01); *H04W 40/24* (2013.01)
 USPC ................ 455/404.2; 455/404.1; 340/539.13; 340/539.15

(58) Field of Classification Search
 USPC .......... 455/403, 404.1, 404.2, 407, 408, 410, 455/412, 2; 340/853.2, 3.1, 3.9, 539.13, 340/539.15
 See application file for complete search history.

(56) References Cited

U.S. PATENT DOCUMENTS

| | | | | |
|---|---|---|---|---|
| 6,127,931 | A * | 10/2000 | Mohr | 340/573.4 |
| 7,259,671 | B2 * | 8/2007 | Ganley et al. | 340/539.23 |
| 2008/0231447 | A1 * | 9/2008 | Grossman | 340/572.1 |
| 2009/0207013 | A1 * | 8/2009 | Ayed | 340/539.1 |
| 2009/0322513 | A1 * | 12/2009 | Hwang et al. | 340/539.12 |
| 2013/0090083 | A1 * | 4/2013 | DeMont et al. | 455/404.2 |

* cited by examiner

*Primary Examiner* — Cong Tran
(74) *Attorney, Agent, or Firm* — Mark Young, P.A.

(57) ABSTRACT

A portable (e.g., watch-sized) wireless electronic device configurable to reflect the identity, preferences or characteristics of the user, and adapted to determine the nearby presence and location of a compatibly configured device includes a micro-controller, data communications subsystem configured to enable two way digital radio communication; a received signal strength indicator subsystem operably coupled to the data communications subsystem and configured to provides a micro-controller subsystem with information about the strength of received signals; a range estimate indicator subsystem operably coupled to the microcontroller and configured to display an estimate of the range to a target unit based on signal strength observed during a scan for the direction of maximum signal strength; a compatibility indicator subsystem operably coupled to the microcontroller and configured to provide an indication of a possible degree of compatibility of a user assigned to a opposing unit; a computer interface subsystem adapted to communicate with a user's computer; and a user control subsystem configured to enable user input.

20 Claims, 5 Drawing Sheets

PORTABLE WIRELESS COMPATIBILITY DETECTION, LOCATION AND COMMUNICATION DEVICE

FIELD OF THE INVENTION

This invention generally relates to electronic communicators and locators and more particularly to a portable wireless electronic device configurable to reflect the identity, preferences or characteristics of the user, and adapted to determine the nearby presence and location of a compatibly configured device.

BACKGROUND

There are many circumstances when it is desirable for a person to discreetly determine if unknown persons within a local area are members of a determined group or have compatible interests or other attributes and/or discreetly communicate with such persons. By way of example, law enforcement personnel engaged in tactical operations wherein stealth is essential need to know if other law enforcement personnel are within a tactical venue, without making a general announcement. Similarly, military personnel engaged in covert operations, (e.g., not in uniform) need to know the identity and location of team members, without giving up their location to a foe. Often it is operationally prudent to conceal a soldier's appearance from the enemy by traveling in disguise and adopting the appearance of the enemy. In these situations, accurately identifying fellow soldiers as distinguished from opposing fighters is difficult if not impossible. Further urban environments make for poorly defined battlefields. Battlefields in which military team members cannot be distinguished from hostiles because of poor lighting conditions or because in an urban fighting environment in building sweeps, the building interior precludes eye to eye contact between team members, necessitate some type of identification, communication and location means.

In covert special operations stealth is essential to a successful operation. Stealth often employs camouflage or non standard fighting uniforms, (e.g. disguise or sniper ghillie suit). Not knowing your team members location can be deadly. Such tactical situations often occur in semi and complete darkness where identifying markings on team members clothing may not be noticeable, as a consequence military team members may be mistaken for enemy combatants.

Socializing is another setting where private identification, location and communication can be of tremendous help, albeit typically not lifesaving. Individuals seeking an intimate relationship may like to know if a compatible person who is also seeking an intimate relationship is in the vicinity. If such a person is in the vicinity, the parties may benefit greatly from notification, location and communication. These are but a few examples of circumstances where it would be desirable to discretely determine whether two nearby individuals, who may not know each other, are a match (i.e., have a degree of correspondence which is sufficient to qualify as a match between them based upon determined criteria).

Problems with conventional methods of determining compatibility include risks of revealing one's own preferences and location, misidentification, rejection and embarrassment. Oftentimes, it is impractical for a person to announce his/her interests and openly inquire if other people in the vicinity are a match. This is particularly true in crowded venues and operations where military personnel risk giving up their location by inquiring if other individuals in the vicinity are friends or foes. Additionally, enemy troops may adopt the appearance of friend (e.g., wearing U.S. military uniforms in an effort to conceal their true identity).

In another setting, an individual seeking a date may be embarrassed to learn that a person to whom they are attracted is unavailable or not interested. Additionally, the person seeking a date may miss an opportunity to meet a nearby compatible person.

To overcome these problems, a wireless, portable device containing a personalized user profile that is installed, edited by and managed by the user on the user's device is needed. Preferably, the device is equipped and configured to sense the presence and determine the location of nearby devices that contain compatible profiles.

The invention is directed to overcoming one or more of the problems and solving one or more of the needs as set forth above.

SUMMARY OF THE INVENTION

In one aspect of the invention, a wireless, portable device containing a personalized user profile that is installed, edited by and managed by the user on the user's device is needed. Preferably, the device is equipped and configured to sense the presence and determine the location of nearby devices that contain compatible profiles. In a particular preferred embodiment the device is in the form of a watch or other article of jewelry, or incorporated into a portable electronic device such as a cellular phone or PDA or pager.

An exemplary wireless electronic device configurable to reflect the identity, preferences or characteristics of the user, and adapted to determine the nearby presence and location of a compatibly configured device includes a microcontroller, data communications subsystem configured to enable two way digital radio communication; a received signal strength indicator subsystem operably coupled to the data communications subsystem and configured to provides a micro-controller subsystem with information about the strength of received signals; a range estimate indicator subsystem operably coupled to the microcontroller and configured to display an estimate of the range to a target unit based on signal strength observed during a scan for the direction of maximum signal strength; a compatibility indicator subsystem operably coupled to the microcontroller and configured to provide an indication of a possible degree of compatibility of a user assigned to a opposing unit; a computer interface subsystem adapted to communicate with a user's computer; and a user control subsystem configured to enable user input. The military version would include a manual or biometric coding mechanism requiring periodic code entry (like and alarm code) by the user, thus preventing the continued operation of the device should fall into the wrong hands.

Another exemplary portable compatibility detection device (e.g., a wristwatch style device) includes a microcontroller, a radio frequency communication means (e.g., a transceiver or a separate transmitter and receiver), such as a Bluetooth radio or a ZigBee radio or some other low power (i.e., no more than 1 mW) radio, operably coupled to the microcontroller, and a memory in which user data is stored. The memory is operably coupled to the microcontroller. A visual display is operably coupled to the microcontroller. The user data including a dataset describing the user and a dataset describing a preference of a user. The radio frequency communication means is configured to receive radio frequency signals directly from and send radio frequency signals directly to a compatible remote portable device within communication range. The compatible remote portable device is controlled by a second user. The microcontroller is configured to determine an extent to which the dataset describing the preference of the user is met by second user based upon the radio frequency signals received from the compatible remote portable device within communication range via the radio frequency communication means. The microcontroller is also configured to cause the visual display to present a visible indicator of the extent to which the dataset describing the preference of the user is met by second user.

In one embodiment, the radio frequency communication means includes means for determining signal strength for a received signal and the microcontroller is configured to calculate an estimated distance based upon the signal strength and to cause the visual display to present a visible indicator of the estimated distance. The microcontroller may be configured to calculate an estimated location using triangulation based upon a plurality of signal strength determinations and to cause the visual display to present a visible indicator of the estimated location. The microcontroller may also be configured to calculate an estimated direction and to cause the visual display to present a visible indicator of the direction.

In another embodiment, the radio frequency communication means determines a time of arrival of a received signal, and the microcontroller is configured to calculate an estimated distance and direction based upon the time of arrival or roundtrip time and to cause the visual display to present a visible indicator of the estimated distance.

In yet another embodiment, the device includes a global positioning system receiver operably coupled to the microcontroller and configured to receive gps satellite signals and determine location data for the device based upon the received gps satellite signals. The radio frequency communication means is configured to send the location data to the compatible remote portable device within communication range and further configured to receive location data for the compatible remote portable device within communication range. The microcontroller is configured to calculate an estimated distance and direction from the portable compatibility detection device to the compatible remote portable device and to cause the visual display to present a visible indicator of the estimated distance and direction.

In another embodiment, an omni-directional beacon transmitter and a directional beacon receiver are provided. The omni-directional beacon transmitter is configured to send out a beacon signal that allows the omni-directional beacon transmitter to be located by a compatible remote portable device within communication range. The directional beacon receiver is configured to receive a beacon signal from the compatible remote portable device. The strength of the beacon signal received is a function of the orientation of the directional beacon receiver relative to the compatible remote portable device. The receiver may include a phased array of antennae.

Other features of an embodiment include an alerting means (e.g., visible, audible or vibratory) for alerting a user to detection of a compatible remote portable device. A computer interface may be operably coupled to the microcontroller and configured to communicatively couple the device to a computer. A plurality of user controls (e.g., button or rotary switches) is operably coupled to the microcontroller. The microcontroller may be configured to encrypt data before transmission by the radio frequency communication means, and decrypt data received by the radio frequency communication means.

In yet another embodiment, a fingerprint reader may be operably coupled to the microcontroller. The memory may store data representing an authorized fingerprint. The microcontroller may prevent use of the device unless data for a fingerprint scanned using the fingerprint reader matches the stored data representing the authorized fingerprint.

BRIEF DESCRIPTION OF THE DRAWINGS

The foregoing and other aspects, objects, features and advantages of the invention will become better understood with reference to the following description, appended claims, and accompanying drawings, where:

Those skilled in the art will appreciate that the invention is not limited to the exemplary embodiments depicted in the figures or the shapes, relative sizes, proportions or materials shown in the figures.

DETAILED DESCRIPTION

Figure 1:
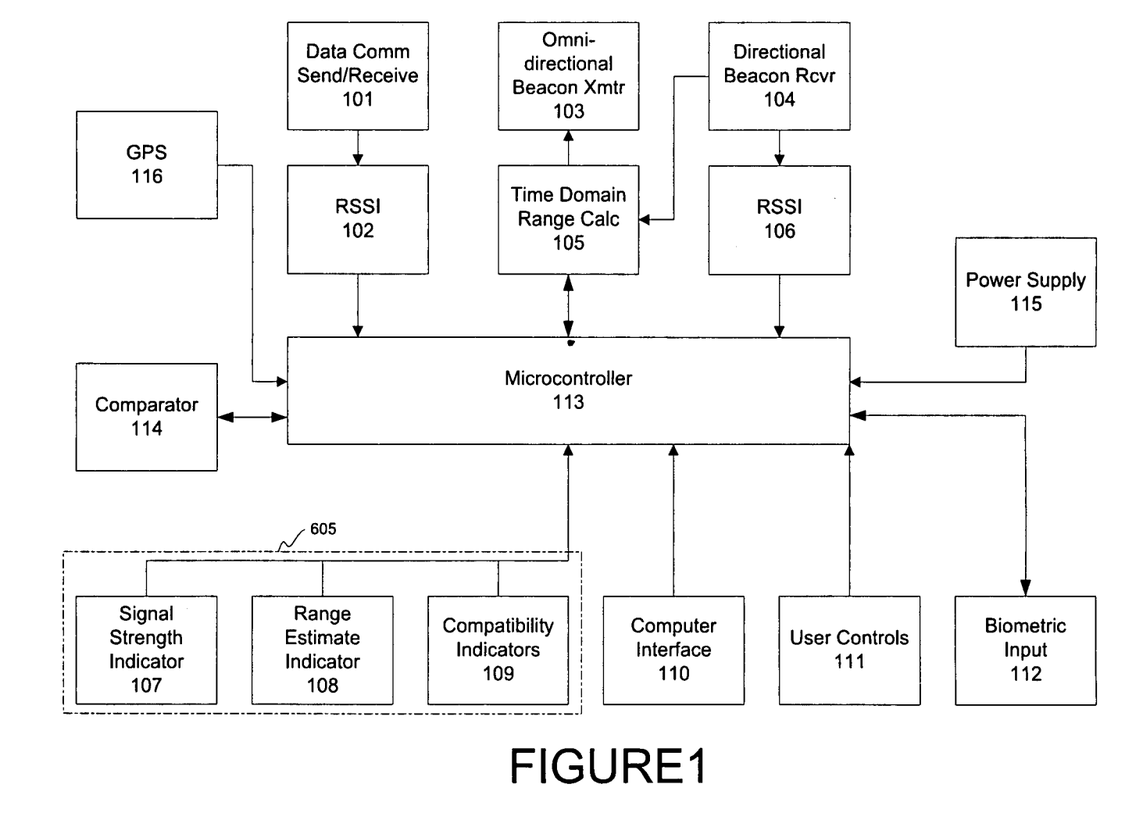
FIG. 1 is a high level block diagram of key electronic subsystems of an exemplary portable wireless electronic device configurable to reflect the identity, preferences or characteristics of a user, and adapted to determine the nearby presence and location of a compatibly configured device in accordance with principles of the invention.

Referring now to FIG. 1, a high level block diagram is provided. The diagram conceptually illustrates electronic subsystems of an exemplary portable wireless electronic device configurable to reflect the identity, preferences or characteristics of a user, and adapted to determine the nearby presence and location of a compatibly configured device in accordance with principles of the invention. A data communications subsystem 101 enables two way digital radio communications to facilitate information exchange with other compatible devices. Optionally, as discussed below, the data communications subsystem 101 may also be adapted for range and bearing determination in some configurations.

A power source 115 may be directly or indirectly coupled to all components of the system that require electric power in order to function, for example, the microcontroller 113, transceiver and a display. The power source may be any power source, such as a battery, or photovoltaic cell, or combinations thereof which are small enough to fit in a standard size watch, and powerful enough to provide enough power to the components requiring such. One or more capacitors may also be used in combination with the power source, providing any delta in the required power provided by the power source during activation and use.

The data communications subsystem 101 may include an antenna coupled to a separate receiver and transmitter or a transceiver which combines both transmission and reception capabilities within a single unit. With the aid of an antenna, the data communications subsystem 101 propagates electromagnetic signals and receives and decodes electromagnetic signals. A transmission component may include an oscillator, a modulator, and one or more amplifiers. The modulator piggybacks (or modulates) signal information onto a carrier frequency, which can then be transmitted. The receiver component of the data communications subsystem 101 comprises an electronic circuit adapted to receive a radio signal from an antenna and decodes the signal for use by the microcontroller 113.

The data communications subsystem 101 may be configured for narrowband or wideband communications. The data communications subsystem 101 will primarily communicate a set of parameters that indicate the preferences, characteristics, greeting or instructions of a user. Transmitted parameters will be received by compatible devices within communication range and processed to determine if the transmitted parameters are compatible with the receiving unit's parameters. Narrowband should suffice for such implementations without rich media content. However, implementations of the portable wireless electronic device that include image data in the exchange data structure may require wideband capability.

RF communication occurs from device to device. The system does not depend upon communication with or through remote servers, or communication through a cellular network. Device to device communication can be carried out in accordance with any compatible radio frequency system, protocols, and specifications, now known or hereafter developed, including, but not limited to, Bluetooth, 802.11x, 802.15x, WLAN, Wife, HF, VHF, S-band, C-band, X-band, a combination thereof, or any other compatible means of local device-to-device wireless transmission.

By way of example and not limitation, communication may be via a low power personal area network, in accordance with the Bluetooth specification. The system may be equipped with a suitable Bluetooth compliant transceiver implemented with existing integrated circuit products, such as, but not limited to, the Motorola MC71000 Bluetooth Baseband Controller, the Motorola MC 13180 Bluetooth RF Transceiver Integrated Circuit, the Motorola MRFIC2408 External Power Amplifier IC, and the Motorola MC13181 power management chip.

Alternatively, communication may be in accordance with the ZigBee specification, which uses small, low-power digital radios based on the IEEE 802.15.4 standard for wireless personal area networks (WPANs). The technology is simpler and cheaper than other WPANs such as Bluetooth. A ZigBee chip, such as the FreeScale MC13211/212/213 ZigBee™— Compliant Platform—2.4 GHz Low Power Transceiver for the IEEE® 802.15.4 Standard with a Microcontroller, is an integrated radio and microcontroller with flash memory, in a small package (e.g., 9×9×1 mm 71-pin LGA). In a beacon-enabled personal area network (PAN) as described herein, the radio sleeps between beacons, thus lowering its duty cycle and extending battery life. By minimizing the time the radio is on, power is conserved. Preferably, the radio(s) should be active while a beacon signal or data stream is being transmitted and/or received.

The ZigBee radio may use direct-sequence spread spectrum coding, which is managed by a digital stream into a modulator. The raw, over-the-air data rate may be about 250 kbit/s per channel in the 2.4 GHz band, 40 kbit/s per channel in the 915 MHz band, and 20 kbit/s in the 868 MHz band. Transmission range may be between about 10 and 75 meters (33 and 246 feet), depending upon the particular environment. The maximum output power of the radios may be about 1 mW. To avoid communication conflicts, the basic channel access mode specified by IEEE 802.15.4-2003, i.e., carrier sense, multiple access/collision avoidance (CSMA/CA), is used. In general, therefore, devices take turns communicating by briefly checking to see that no other device is communicating before commencing communication.

Time-based positioning techniques rely on measurements of travel times of signals between nodes. If two nodes have a common clock, the node receiving the signal can determine the time of arrival (TOA) of the incoming signal that is time-stamped by the reference node. However, if there is no synchronization between given nodes, then TOA ranging may be implemented using a two-way or "round-trip" time-of-arrival measurement, allowing compatible devices to measure the total delay between an original inquiry and a returned response. Ranging is also possible using RSSI measurement. RSS measurements can be averaged over frequency to reduce frequency-selective fading errors.

A received signal strength indicator (RSSI) subsystem 102 operably coupled to the data communications subsystem 101 provides the microcontroller 113 with information about the strength of received signals. Signal strength, which is an assessment of how strongly a transmitted signal is being received, may be measured as signal electric field strength of voltage per length or signal power received. Such measurements may be useful in determining a range to a transmitter of known power output, as signal strength is generally a factor of proximity, except to the extent that reflection and absorption of RF signals may affect the correlation between signal strength and proximity. Additionally, if the data communications device 101 uses a directional antenna, then observing changes in signal strength as a user changes direction of a receiving antenna may indicate the bearing to the unit that is transmitting. RSSI measurements will vary from a minimum to a maximum (e.g., 0 to 255) and consist of a one-byte integer value. A value of 1 will indicate the minimum signal strength detectable by the device, while 0 indicates no signal. With knowledge of the transmitting power (it being the same as that of the compatible receiving device) a free space distance may be estimated. Several (e.g., 3 or more) sequential estimates, each at a different relative position, may be utilized to estimate location through triangulation.

A location function may be enhanced by working at a different frequency than the data communications subsystem 101. In one embodiment, a separate locator beacon subsystem may be provided. The locator beacon subsystem is comprised of an omni-directional beacon transmitter 103 and a directional beacon receiver 104. When activated, the omni-directional beacon transmitter 103 sends out a signal that allows the beacon to be located. The omni-directional beacon transmitter 103 enables compatible receivers to pick up a transmitted beacon signal equally well from any vector.

A directional beacon receiver 104 is comprised of a directional antenna and a radio receiver tuned to a determined locator system frequency. The directional antenna may be adapted to receive maximum power in a particular direction.

In such an embodiment, strength of a beacon signal received via the directional antenna will vary as the unit is rotated relative to a transmitting unit. In another embodiment the directional antenna may be comprised of a phased array, with which the directional beacon receiver 104 could calculate a vector to the opposing beacon's transmitter.

Optionally, the portable wireless electronic device may include a time domain range calculator subsystem 105 adapted to calculate the range from the receiving device to a transmitting device based upon the propagation time of the transmitted signals. Accuracy of the range may be improved by repeatedly looping a short token signal from one unit to the other with a fixed latency at each end. By measuring the total time of a large number of loops, the time domain range calculator subsystem 105 may accurately determine propagation time without expensive high resolution time measuring technology.

A received signal strength indicator (RSSI) subsystem 106 operably coupled to the directional beacon receiver 104 provides the micro-controller subsystem 112 with information about the strength of signals received by the directional beacon receiver 104. This received signal strength indicator (RSSI) subsystem 106 may work the same way as the received signal strength indicator (RSSI) subsystem 102 operably coupled to the data communications subsystem 101. Signal strength, which is an assessment of how strongly a transmitted signal is being received, may be measured as signal electric field strength of voltage per length or signal power received. Such measurements may be useful in determining a range to a transmitter of known power output, as signal strength is generally a factor of proximity, except to the extent that reflection and absorption of RF signals may affect the correlation between signal strength and proximity. In one embodiment, received signal strength indicator (RSSI) subsystem 106 may be used instead of a received signal strength indicator (RSSI) subsystem 102 operably coupled to the data communications subsystem 101. In another embodiment, the received signal strength indicator (RSSI) subsystem 106 may be used in addition to the received signal strength indicator (RSSI) subsystem 102 operably coupled to the data communications subsystem 101.

A signal strength display subsystem 107 is operably coupled to the microcontroller 113. The signal strength display subsystem 107 may comprise a driver for a row of LEDs or an LCD multi-segment bar adapted to provide a user a quick intuitive indication of relative signal strength from an opposing unit (i.e., a compatible unit within communication range). The variable bar indicator, such as the graphical display 635 shown in FIG. 6, may move up and down or side to side, based on the signal strength variation as the user points the receiver (e.g., the directional beacon receiver 104) in different directions. Finding the direction at which the bar shows the highest signal strength would generally indicate the direction of the transmitting device of interest, except to the extent that reflection and absorption of RF signals may distort the correlation between signal strength and direction/proximity. A direction indicator such as a graphically displayed compass needle 650 may also be graphically displayed.

A range estimate indicator subsystem 108 is operably coupled to the microcontroller 113. The range estimate indicator subsystem 108 may be comprised of an analog or digital numeric display showing a rough estimate of the range to the target unit based on the highest signal strength observed during a scan for the direction of maximum signal strength. By way of example and not limitation, range may be communicated to a user by graphical or numerical display 640, such as the estimate of 50 feet as shown in FIG. 7.

A compatibility indicator subsystem 109 is operably coupled to the microcontroller 113. The compatibility indicator subsystem 109 may be comprised of an analog or digital display that provides visual indication of a possible degree of compatibility of a user assigned to the opposing unit. Compatibility may be determined based upon the degree of similarity between preferences or characteristics programmed in a receiving unit and a transmitting unit. Such programmed preferences or characteristics are referred to herein as a user profile. By way of example and not limitation, a receiving unit may perform a correlation analysis between a transmitting unit's user profile and the receiver unit's user profile. The compatibility indicator subsystem 109 may show the degree of correlation or percent match between the two profiles. Illustratively, a numerical display may show a match of 80% or 8 out of 10 criteria. Alternatively, in a military or law enforcement friend or foe application, the compatibility indicator subsystem 109 may perform a binary function, indicating whether or not a friend with a compatible device is detected in the vicinity. In another embodiment, in addition to or in lieu of showing a degree of correlation or percent match, the compatibility indicator subsystem 109 may be configured to show whether the degree of correlation or percent match meets or exceeds a receiving unit's user pre-set matching level and a transmitting unit's user pre-set matching level.

Additionally, for further interaction with the user, the device may include alerting means such as a buzzer for emitting sounds, a vibrator for a more discrete alerting and an LED for emitting light. The compatibility indicator subsystem 109 may be configured to alert the user by visual, acoustical and/or tactile (e.g., vibratory) means. The means for alerting may be user-selectable, allowing a user to select an alert suitable for an occasion. Illustratively, visible, audible and vibratory alerts may be suitable for noisy environments, but not preferred for covert law enforcement, intelligence and military missions.

A computer interface subsystem 110 is provided to communicate with a user's computer. The computer interface subsystem 110 enables a user to download or modifying unit configurations and user profile from a computer. This could be a USB and/or RS232 interface or any other subsystem now known or hereafter developed for data communication with a compatibly equipped personal computer. Advantageously, USB interface makes it possible to power/charge the apparatus while connected, as USB also provides power through its communication cable.

Figures 5, 6:
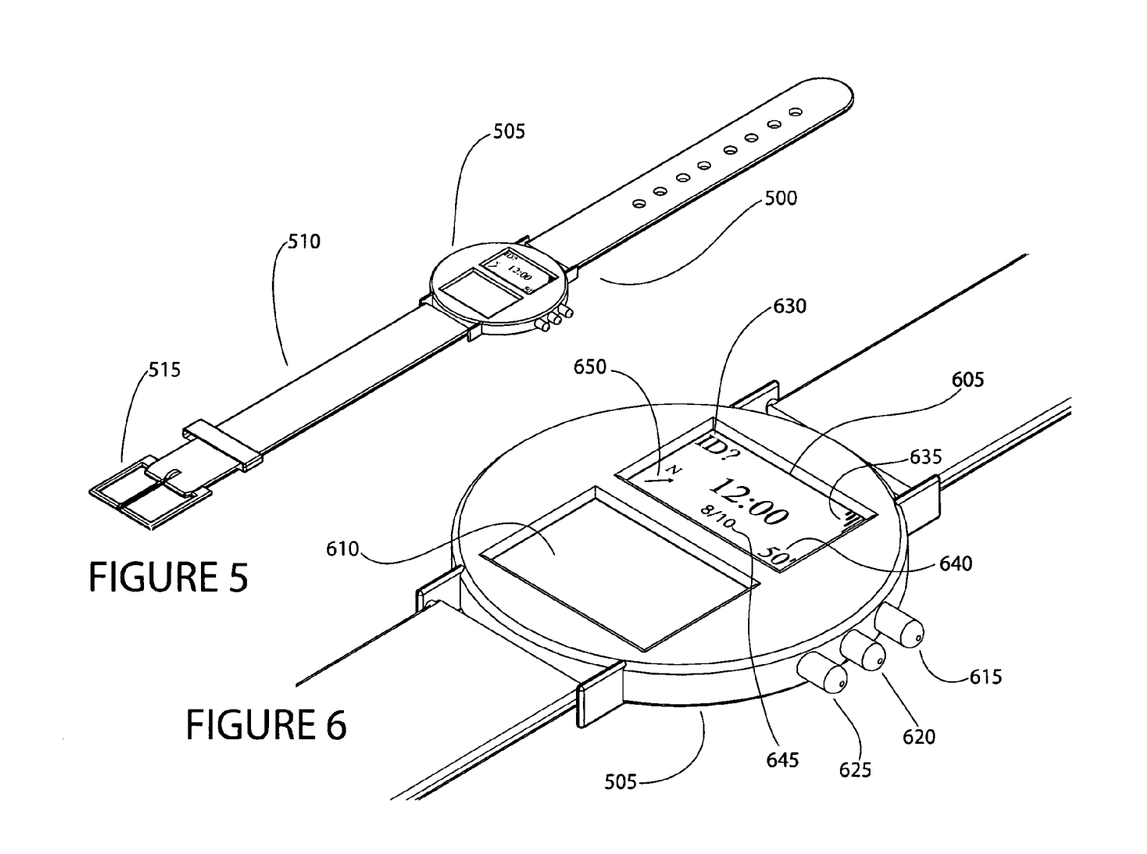
FIG. 5 is a perspective view of an exemplary watch device configurable to reflect the identity, preferences or characteristics of a user, and adapted to determine the nearby presence and location of a compatibly configured device in accordance with principles of the invention.
FIG. 6 is a perspective view of an exemplary face of an exemplary watch device configurable to reflect the identity, preferences or characteristics of a user, and adapted to determine the nearby presence and location of a compatibly configured device in accordance with principles of the invention.

A user control subsystem 111 (e.g., interface) provides user activated switches 615-625 or other controls with which to make user selections as to how a unit should operate and respond to other units in the reception area. The interface includes the input devices as well as the graphical display 605, textual and auditory output means employed to control and operate the system.

The microcontroller subsystem 113 (i.e., the microcontroller 113) is any of a broad class of embedded intelligence devices. It is used to implement all logical control functions and the compatibility comparison between the user's selection criteria and the opposing unit owner's personal data. It also runs the location functions, to assist the user to identify the prospective compatible user from some distance. By way of example and not limitation, the microcontroller may contain the memory and interfaces needed for performing the functions. Illustratively, the microcontroller may be a single integrated circuit with a central processing unit—ranging from small and simple 8-bit processors to sophisticated 32- or 64-bit processors, input/output interfaces such as serial ports, peripherals such as timers and watchdog circuits, RAM for data storage, ROM, EEPROM or Flash memory for program storage, a clock generator, e.g., an oscillator for a quartz timing crystal, and a resonator or RC circuit.

A biometric input device 112, such as a fingerprint reader 610, may be operably coupled to the device. The biometric input device guards against unauthorized use, which can be critical in law enforcement and military settings. Preferably, a solid-state fingerprint sensor is provided, as a rugged, direct contact, fingerprint acquisition device. Fingerprint authentication provides a reliable, quick, and user-friendly alternative to password inefficiency which requires the user to recall and enter cumbersome and often numerous code combinations. The exemplary fingerprint sensor is comprised of an array of electrodes, with each electrode acting as one capacitor plate and the contacting finger acting as a second capacitor plate. A passivation layer on the surface of the device forms a dielectric between these two plates. A finger-press on the sensor creates varying capacitor values across the array that are then converted into an image of the fingerprint. The values of the array are determined by the contour (ridges and valleys) of the fingerprint. The sensor quickly captures several images of the fingerprint and selects the highest quality image. Once the fingerprint has been scanned, it is verified against a stored template of the individual's fingerprint. The Fujitsu MBF200 is an example of a such a fingerprint sensor array with a CMOS 256×300 array, an integrated 8 bit analogue-to-digital converter used to digitize the output of the sensor array, all in an integrated 24 mm by 24 mm by 1.4 mm package with a 12.8 by 15 mm sensor area 610. The system includes input controls 615-625 to activate the fingerprint sensor, make selections and input information and instructions.

The fingerprint reader 112 reads the fingerprint on a finger applied to the sensing area 610, and sends an image or other electronically processable representation of the fingerprint to the microcontroller 113 for analysis. The fingerprint reader 112 will fit into the watch sized system 500. In operation, the microcontroller 113 is programmed to receive an image from the fingerprint sensor 610, compare the received fingerprint to a fingerprint image (or other fingerprint data) obtained when the system was initialized by the user and stored in system memory. The comparison may be performed by the microcontroller or, optionally, using a dedicated comparator unit 114. Based upon the comparison, the microcontroller 113 determines if the data corresponding to the sensed fingerprints match. If there is a match, the microcontroller 113 enables functions and the transceiver. If there is not a match, the microcontroller 113 disables functions and the transceiver. The memory may be contained in the microcontroller 113, and may be used to store the originally enrolled fingerprint data, other information about the user, parameters as to the use of the system, and, optionally, information for generating one-time-passcodes or other cryptographic information, such as PKI, etc., for secure communications.

In an embodiment, the information transmitted by the transceiver when the fingerprint is correctly authenticated includes a one-time passcode generated by a pseudo-random number generator or the microcontroller 113. The pseudo-random number generator may use a sequence-based algorithm, in which case the most recent number in the sequence is stored in memory, or a time-based algorithm using a real-time clock powered by the power supply 115. An "authenticated" message may be communicated by the transceiver 101 to a remote compatible device to indicate that the biometric information has been verified and the session may proceed. Otherwise, the transceiver 101 may send a message explicitly indicating that no fingerprint, or an apparently wrong fingerprint, has been presented for authentication. Upon receipt of such message, the remote device may reject further communications from the unauthenticated device except for a subsequent authenticated message, should one eventually be communicated. Rejection may entail filtering of information received by the remote transceiver.

In another embodiment, upon receiving an authenticated message, a receiving unit may issue to the authenticated unit a one-time passcode from the pseudorandom number generator for that session for that unit. The authenticated unit may use the passcode as an encryption key for all communications from that unit for the session.

Before information is exchanged with another portable communication apparatus, the information is advantageously but not necessarily encrypted to increase the safety and privacy for users. Therefore, the portable communication device may comprise encryption and decryption means for encrypting information prior to transmission, and decrypting information after reception. The encryption means advantageously operates according to any data encryption algorithm, such as an asymmetric algorithm like RSA, or a symmetric algorithm like DES. A decryption means will operate in accordance with the corresponding data decryption algorithm. Advantageously, the encryption and decryption means are implemented as software modules stored in memory in the microcontroller 113 and executed by the microcontroller 113, or alternatively as hardware.

Optionally, the system may include a compact GPS receiver 116 to determine position data from received satellite signals. The GPS receiver 116 and other radio frequency communication components may share an antenna, or use separate antennae provided with the system. If a GPS receiver 116 is provided, the microcontroller 113 may determine location periodically based upon signals received by the GPS receiver 116. A loss of GPS signal may indicate an indoor location, in which case the last known GPS location may be used to indicate a general location. The GPS location data may be used in lieu of or in addition to the relative location information obtained through analysis of radio frequency communication signals between compatible devices in communication range.

Software for a device according to the invention may be divided into three major sub systems: an application software portion, a base software portion and a real time operating system. The operating system processes system data and user input, responds by allocating and managing tasks and internal system resources, controls and allocates memory, prioritizes system requests, controls input and output devices, facilitates networking and manages data and files. The application software includes various units of program code, which when executed by the microcontroller 113 will implement all the necessary functionality of the device. The base software provides supportive base functionality and hardware-dependent functionality such as device drivers Referring now to FIG. 2, a high level flow chart of an exemplary communication methodology for use with a portable wireless electronic device configurable to reflect the identity, preferences or characteristics of a user, and adapted to determine the nearby presence and location of a compatibly configured device in accordance with principles of the invention is shown. The device listens for requests from other compatible devices, as in step 205. If a request is received as in step 210, it is determined if data or location are requested, as in steps 215, 235. As discussed above, biometric authentication may be a prerequisite for data and location requests and for responses thereto.

Figure 2:
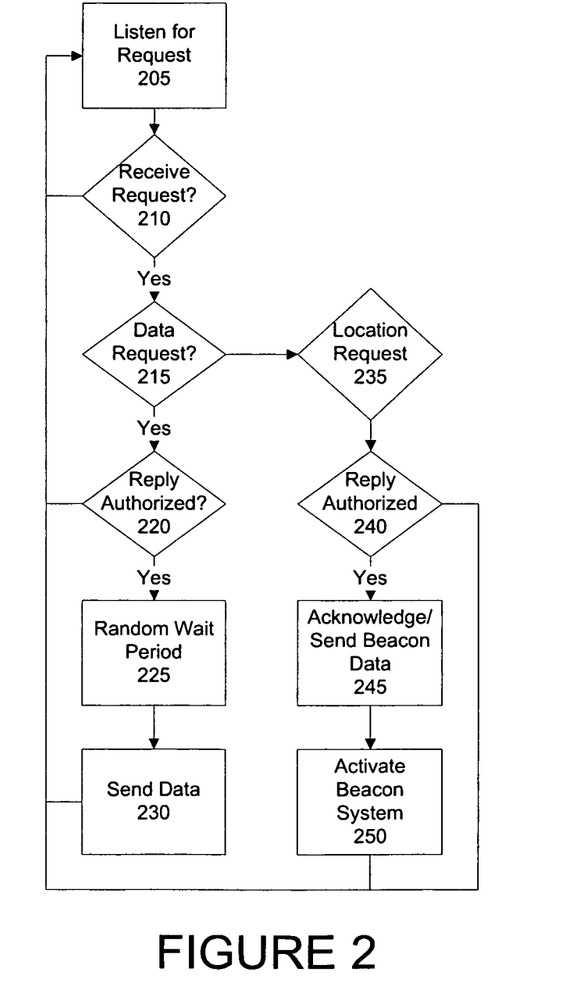
FIG. 2 is a high level flow chart of an exemplary communication methodology for use with a portable wireless electronic device configurable to reflect the identity, preferences or characteristics of a user, and adapted to determine the nearby presence and location of a compatibly configured device in accordance with principles of the invention.

If location is requested, it is determined if a reply is authorized, as in step 240. Replies may be always authorized or authorized only upon occurrence of certain programmed events and/or user-specified conditions. If a location reply is authorized, then the request is acknowledged and beacon data is sent, as in step 245. The beacon subsystem is then activated for a determined time to facilitate location detection between communicating units, as in step 250.

If data is requested, it is determined if a reply is authorized, as in step 220. Replies may be always authorized or authorized only upon occurrence of certain programmed events and/or user-specified conditions. If a data reply is authorized, then after a waiting period to avoid a communication conflict as in step 225, a personal data structure may be sent as in step 230.

Communication between compatible devices entails transmission and receipt of a data stream. The data stream comprises a sequence of digitally encoded coherent signals (i.e., data packets) used to transmit and receive information. The data packets conform to the data structure, comprising references to variable information. Such variable information may include an authentication indicator (e.g., a 0 or 1, with a 1 indicating that the sender is authenticated), various bits of data devoted to characteristics and/or identity (e.g., sex, age, height, etc. . . . ), as well as any other information pertinent to a session. By way of example and not limitation, in a military or law enforcement setting, references in the data structure may include an authentication indicator and identify an office, squad, rank and/or serial or badge number.

Figure 3:
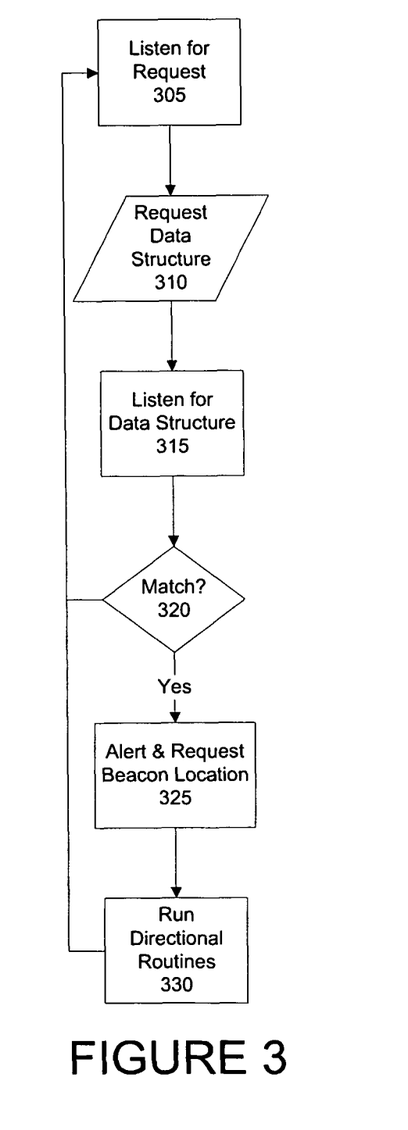
FIG. 3 is a high level flow chart of an exemplary compatibility determination methodology for use with a portable wireless electronic device configurable to reflect the identity, preferences or characteristics of a user, and adapted to determine the nearby presence and location of a compatibly configured device in accordance with principles of the invention.

Referring now to FIG. 3, a high level flow chart of an exemplary compatibility determination methodology for use with a portable wireless electronic device configurable to reflect the identity, preferences or characteristics of a user, and adapted to determine the nearby presence and location of a compatibly configured device in accordance with principles of the invention is shown. The device listens for a request as in step 305. When a data structure is requested and authorized, as in step 310, the requesting unit waits to receive the data structure, as in step 315, and then tests it for a match, affirmative determination or compatibility determination, as in step 320. If the determination is affirmative, the other device is alerted and the beacon location for that device is requested, as in step 325. Subsequently, directional routines are run to determine or estimate relative or absolute direction, as in step 330.

Advantageously, a portable wireless electronic device according to principles of the invention compares an owner's selection criteria for a potential match, with a potential compatible user's data structure, and indicates to the users if that person is a likely match. The data structure may be received from some distance, which is limited only by the communications equipment and terrain. A received data structure may be analyzed against the owner's selection criteria. The device assists the user to locate a likely match, by virtue of directional location, at some distance. This may enable a user to see a prospective match before actually making contact in person.

The exemplary device and processes employ a personal data structure that will contain data pertaining to all of the factors that have been determined to be relevant to the compatibility determination process. Users may complete a set of compatibility criteria describing their own interests and preferences, based upon elements included in the personal data structure. In the case of individuals seeking dating opportunities, the data structure may include data corresponding to the user as well as the user's preferences. When a compatible device receives an authorized data structure from a prospective match, an algorithm is applied to determine the probability that the prospective match is compatible. If the match hits some threshold of suitability, then the user(s) may employ the location functions to find one another. Based upon user settings, one's own unit may sometimes only respond with a reduced personal data structure, if the user does not wish to make the entire data structure available to all inquiries. While the smaller data structure increases privacy, it also broadens the compatibility base. By increasing the available data structure, (shared information) the compatibility base is narrowed to fewer potential compatible users', thus providing a higher degree of accuracy as to the true compatibility of another user. If a prospective match is "interesting" one could authorize a more complete set of personal information to be sent to that inquiry.

In a military or law enforcement implementation, when mission-specific, the compatibility determination may be binary—a remote user is either a friend or not—and the personal data structures would presumptively be identical, i.e., a 100% match, or not. A similar data structure may be utilized to identify law enforcement personnel, undercover agents and investigators. Knowledge of all allies within vicinity may help avoid friendly fire, blown cover and other potentially lethal or embarrassing mistakes.

Advantageously, a device according to principles of the invention inquires about and receives wirelessly, personal data from other compatible devices within some distance away, e.g., a 100 yard range. The invention may listen for data requests. Data requests from units in within range will be broadcast to all units in range on a regular schedule or at the user's initiation. Units receiving the request, and that have been set to do so, will respond after a random delay period, thus reducing the probability of collisions on the radio channel. As personal data structures are received, the unit places them in memory for future reference. If one of the received personal data structures seems to be a likely match, the unit can address further messages to that unit specifically. Wireless data communication may be encrypted to some degree. Any unit that has observed another units request for personal data may later request personal data from the unit that made the original request.

Another benefit of a device according to principles of the invention is that if another user is determined to be "interesting" as a prospective match, the unit may be used as a locating device, to help one find the prospective match before actually making an encounter in person. This will afford the user(s) an opportunity to reject the other party based on appearance without the embarrassment of having to make an excuse in person. There are several possible methods for the location functions. One embodiment could use a directional antenna with which to find the vector with the greatest signal strength from the other unit. If one wishes to locate the other party of interest, the locating unit will send a locate request to the other unit. If that unit is set to respond to such requests, it will begin transmitting a location beacon signal on which the location receiving unit may home in.

Figure 4:
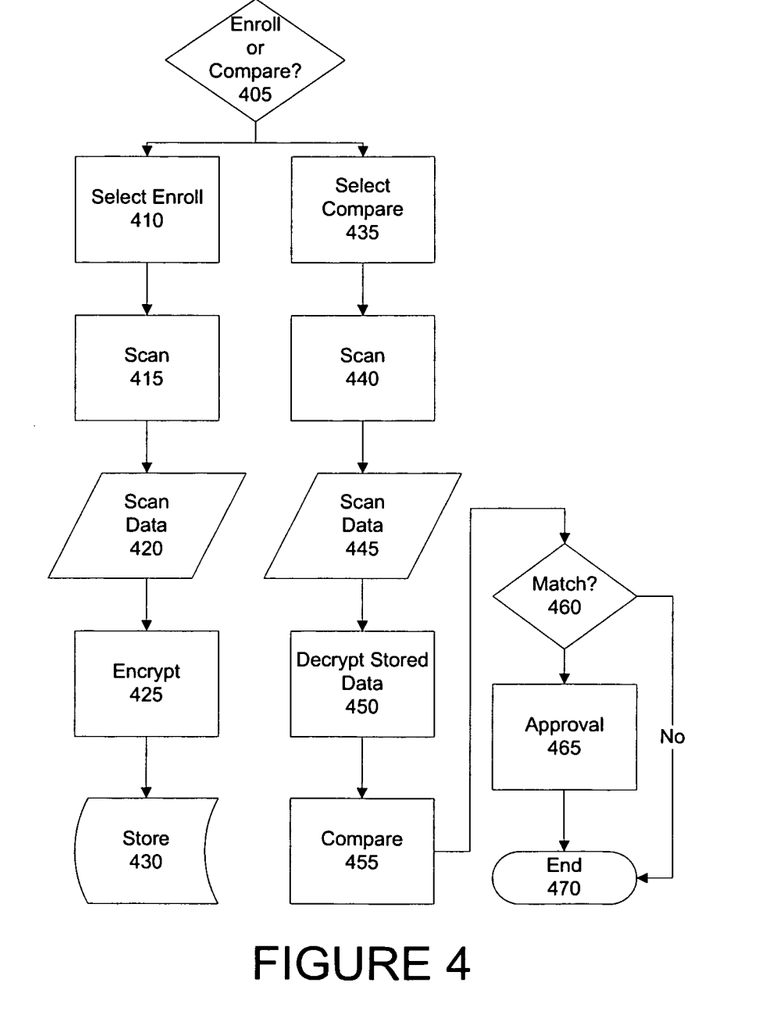
FIG. 4 is a high level flow chart of an exemplary authentication methodology for use with a portable wireless electronic device configurable to reflect the identity, preferences or characteristics of a user, and adapted to determine the nearby presence and location of a compatibly configured device in accordance with principles of the invention.

The fingerprint reader 112, 610 allows initial enrollment and subsequent reading to authenticate a user, as in step 405. The enrollment process may be password protected or require a communications link with a remote secure computer. Thus, selecting enrollment may entail selecting the enrollment option from a list of menu items and complying with any security protections, as in step 410. Next, the user's fingerprint is scanned using the reader 610, as in step 415. Reader 112, coupled to microcontroller 113, with a sensing area 610 receives a signal from sensing area 610 indicative of the presence of a finger on its surface. The reader 112 translates the biometric signal, e.g., the imprint from the finger, into a signal or data that is forwarded to microcontroller 113. The method by which reader 112 translates the fingerprint of the user into a usable signal may be any method known in the art or hereafter to be developed for reading fingerprints electronically. Thus, data representing the scanned fingerprint is generated for processing and storage, as in step 420. The data may be encrypted and stored in memory in the microcontroller 113, as in steps 425 and 430.

The authentication branch is initiated by selecting to compare fingerprint data with the authenticated user's fingerprint data stored in the microcontroller, as in step 435. Next, the user's fingerprint is scanned using the reader 610, as in step 440. Data representing the scanned fingerprint is generated for comparison, as in step 445. The encrypted fingerprint data stored in the microcontroller is decrypted and temporarily held in memory for comparison, as in step 450. Next, the data representing the scanned fingerprint is compared with the decrypted fingerprint data as in step 455. Comparison may be performed by the microcontroller 113 or a dedicated comparator 114. If the compared data match, as in step 460, an approval message is generated, as in step 465. However, if there is no match, the process ends, as in step 470, without generating an approval code, and an error or alarm message may be generated. Without the approval message, any process that requires authentication will not proceed. Only with an approval code will a process that requires authentication proceed.

Referring now to FIGS. 5 and 6, an exemplary portable wireless electronic device in the form of a wristwatch 500 is configurable to reflect the identity, preferences or characteristics of the user, and adapted to determine the nearby presence and location of a compatibly configured device. The watch 500 includes a housing 505 for containing the electronic components described above as well as the electronic movement that measures the passage of time and generates a display of current time. The watch 500 includes a wristband 510 and buckle 515 for releasable attachment. A visible display 605 such as an LCD display is provided. An ID indicator 630 alerts a user to a compatible device within range. A user may select to proceed with a communication session using user input buttons 615-625. The display also shows a signal strength indicator 635, graphically representing the strength of signal between communicating units. A graphically displayed compass-like direction needle 650 is shown to indicate absolute direction of the nearby compatible unit relative to the user. An estimate of distance 640 is also presented. The distance and direction may be determined using the components and processes described above. Furthermore, a compatibility indication 645 is provided to indicate whether the nearby party is a match, and if so how strong a match. The face of the watch also includes the fingerprint reader 610 for user authentication. Various other indicators such as a battery low indicator, fingerprint authenticated indicator, and a mode of use indicator (e.g., silent, vibrate and audible modes) may be provided on the display 605.

The wristwatch shown in FIGS. 5 and 6 is provided for exemplary purposes only. The invention is not limited to a wristwatch embodiment, much less the wristwatch shown in FIGS. 5 and 6. Rather, a portable wireless electronic device in accordance with principles of the invention may take the form of a standalone electronic device or may be incorporated into another electronic device.

In sum, an exemplary portable wireless electronic device configurable to reflect the identity, preferences or characteristics of a user, and adapted to determine the nearby presence and location of a compatibly configured device in accordance with principles of the invention, provides a two way wireless data link. All data exchanges may be encrypted. A data structure is provided to exchange relevant information to confirm compatibility with a potential match within the wireless data transmission range. A scan mode is provided where the device continually sends interrogation requests in order to collect selection data on other users of compatible devices in range. Direction and range functions are provided to locate the potential match's transmitting device. The device may ignore and/or not respond to requests. The device may respond to a data request with an abbreviated data structure, thereby keeping parts of the full data structure private. The data in the device may be modified. A user interface and display enable easy navigation, with the aid of the direction and range functions, to a user within range with a desirable selection criteria match. Interrogation requests may be blocked from certain other of these devices, if that user device is on a "not compatible" list of previously tested matches.

In a particular preferred embodiment, an exemplary portable wireless electronic device configurable to reflect the identity, preferences or characteristics of a user, and adapted to determine the nearby presence and location of a compatibly configured device in accordance with principles of the invention, is configured as a watch or other article of jewelry, or incorporated into another portable electronic device such as a cellular telephone, pager, PDA or similar equipment.

While an exemplary embodiment of the invention has been described, it should be apparent that modifications and variations thereto are possible, all of which fall within the true spirit and scope of the invention. With respect to the above description then, it is to be realized that the optimum relationships for the components and steps of the invention, including variations in order, form, content, function and manner of operation, are deemed readily apparent and obvious to one skilled in the art, and all equivalent relationships to those illustrated in the drawings and described in the specification are intended to be encompassed by the present invention. The above description and drawings are illustrative of modifications that can be made without departing from the present invention, the scope of which is to be limited only by the following claims. Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents are intended to fall within the scope of the invention as claimed.

What is claimed is:

1. A portable compatibility detection device comprising a microcontroller, a radio frequency communication means operably coupled to the microcontroller, a first nonvolatile memory in which user data is stored, said first memory being operably coupled to the microcontroller, a second nonvolatile memory in which a data comparison instruction set is stored, said second memory being operably coupled to the microcontroller and said data comparison instruction set being executable by the microcontroller, a visual display operably coupled to the microcontroller, said user data including a dataset describing the user and a first dataset describing a personal preference of a user, said radio frequency communication means being configured to receive radio frequency signals directly from and send radio frequency signals directly to a compatible remote portable device within communication range, said compatible remote portable device being controlled by a second user, said microcontroller executing the data comparison instruction set to determine an extent to which the dataset describing the personal preference of the user is met by second user based upon a second dataset extracted from the radio frequency signals received from the compatible remote portable device within communication range via the radio frequency communication means, said second data set including personal preference data of the second user, and said microcontroller being configured to cause the visual display to present a visible indicator of the extent to which the dataset describing the personal preference of the user is met by second user.

2. A portable compatibility detection device according to claim 1, wherein the radio frequency communication means includes means for determining signal strength for a received signal, and said microcontroller is configured to calculate an estimated distance based upon said signal strength, and said microcontroller being configured to cause the visual display to present a visible indicator of the estimated distance.

3. A portable compatibility detection device according to claim 1, wherein the radio frequency communication means includes means for determining signal strength for a received signal, and said microcontroller is configured to calculate an estimated location using triangulation based upon a plurality of signal strength determinations, and said microcontroller being configured to cause the visual display to present a visible indicator of the estimated location.

4. A portable compatibility detection device according to claim 1, wherein the radio frequency communication means includes means for determining signal strength for a received signal, and said microcontroller is configured to calculate an estimated location and direction using triangulation based upon a plurality of signal strength determinations, and said microcontroller being configured to cause the visual display to present a visible indicator of the estimated location and direction.

5. A portable compatibility detection device according to claim 1, wherein the radio frequency communication means includes means for determining signal strength for a received signal, and said microcontroller is configured to calculate an estimated distance based upon said signal strength, and said microcontroller being configured to cause the visual display to present a visible indicator of the signal strength and estimated distance.

6. A portable compatibility detection device according to claim 1, wherein the radio frequency communication means includes means for determining a time of arrival of a received signal, and said microcontroller is configured to calculate an estimated distance based upon said time of arrival, and said microcontroller being configured to cause the visual display to present a visible indicator of the estimated distance.

7. A portable compatibility detection device according to claim 1, wherein the radio frequency communication means includes means for determining a roundtrip time of arrival of a received signal in response to a sent signal, and said microcontroller is configured to calculate an estimated distance based upon said time of arrival, and said microcontroller being configured to cause the visual display to present a visible indicator of the estimated distance.

8. A portable compatibility detection device according to claim 1, wherein the radio frequency communication means includes means for determining a roundtrip time of arrival for each of a plurality of received signals in response to each of a plurality of sent signals, and said microcontroller is configured to calculate an estimated distance and direction based upon said roundtrip time of arrival for each of a plurality of received signals, and said microcontroller being configured to cause the visual display to present a visible indicator of the estimated distance and direction.

9. A portable compatibility detection device according to claim 1, further comprising a global positioning system receiver operably coupled to the microcontroller and configured to receive gps satellite signals and determine location data for the device based upon the received gps satellite signals, and said radio frequency communication means being configured to send said location data to the compatible remote portable device within communication range and further configured to receive location data for the compatible remote portable device within communication range, and said microcontroller being configured to calculate an estimated distance and direction from the portable compatibility detection device to the compatible remote portable device, and said microcontroller being configured to cause the visual display to present a visible indicator of the estimated distance and direction.

10. A portable compatibility detection device according to claim 1, said radio frequency communication means comprising a Bluetooth compliant transceiver.

11. A portable compatibility detection device according to claim 1, said radio frequency communication means comprising a ZigBee compliant transceiver.

12. A portable compatibility detection device according to claim 1, said radio frequency communication means comprising a transceiver with a maximum output power of no more than 1 mW.

13. A portable compatibility detection device according to claim 1, said radio frequency communication means including an omni-directional beacon transmitter and a directional beacon receiver, said omni-directional beacon transmitter being configured to send out a beacon signal that allows the omni-directional beacon transmitter to be located by a compatible remote portable device within communication range, said directional beacon receiver being configured to receive a beacon signal from the compatible remote portable device and the strength of the beacon signal received being a function of the orientation of the directional beacon receiver relative to the compatible remote portable device.

14. A portable compatibility detection device according to claim 1, said radio frequency communication means including an omni-directional beacon transmitter and a directional beacon receiver, said omni-directional beacon transmitter being configured to send out a beacon signal that allows the omni-directional beacon transmitter to be located by a compatible remote portable device within communication range, said directional beacon receiver comprising a phased array of antennae and being configured to receive a beacon signal from the compatible remote portable device.

15. A portable compatibility detection device according to claim 1, further including an alerting means for alerting a user to detection of a compatible remote portable device.

16. A portable compatibility detection device according to claim 1, further including a computer interface operably coupled to the microcontroller and configured to communicatively couple the device to a computer.

17. A portable compatibility detection device according to claim 1, further including a plurality of user controls operably coupled to the microcontroller.

18. A portable compatibility detection device according to claim 1, further including a fingerprint reader operably coupled to the microcontroller, said memory storing data representing an authorized fingerprint, said microcontroller preventing use of the device unless data for a fingerprint scanned using the fingerprint reader matches the stored data representing the authorized fingerprint.

19. A portable compatibility detection device according to claim 1, wherein said microcontroller is configured to encrypt data before transmission by the radio frequency communication means, and decrypt data received by the radio frequency communication means.

20. A portable compatibility detection device according to claim 1, said device being a wristwatch.

* * * * *